(12) United States Patent
Holzer

(10) Patent No.: US 9,072,287 B2
(45) Date of Patent: Jul. 7, 2015

(54) ADJUSTABLE ROD HOLDER

(76) Inventor: Robert Charles Holzer, Orofino, ID (US)

( * ) Notice: Subject to any disclaimer, the term of this patent is extended or adjusted under 35 U.S.C. 154(b) by 661 days.

(21) Appl. No.: 13/136,037

(22) Filed: Jul. 20, 2011

(65) Prior Publication Data

US 2013/0019515 A1  Jan. 24, 2013

(51) Int. Cl.
*A01K 97/10* (2006.01)

(52) U.S. Cl.
CPC ....................................... *A01K 97/10* (2013.01)

(58) Field of Classification Search
CPC ....................................................... A01K 97/10
USPC ........... 43/21.2; 248/511, 514, 519, 520, 534, 248/538

See application file for complete search history.

(56) References Cited

U.S. PATENT DOCUMENTS

| | | | | |
|---|---|---|---|---|
| 2,682,127 A * | 6/1954 | Binder | ........................... | 43/21.2 |
| 3,484,066 A * | 12/1969 | Aunspaugh | ................... | 248/541 |
| 3,906,653 A * | 9/1975 | Williams | ........................ | 43/21.2 |
| 4,161,839 A * | 7/1979 | Ward | ................................. | 43/17 |
| 4,528,768 A * | 7/1985 | Anderson | ...................... | 43/21.2 |
| 4,827,654 A * | 5/1989 | Roberts | .......................... | 43/21.2 |
| 5,313,734 A * | 5/1994 | Roberts | .......................... | 43/21.2 |
| 6,584,723 B2 * | 7/2003 | Elmore | ............................. | 43/4.5 |
| 7,669,361 B2 * | 3/2010 | Baez | ............................... | 43/27.4 |
| 7,686,276 B1 * | 3/2010 | McCauley | ..................... | 248/535 |
| 7,757,424 B2 * | 7/2010 | Follmar | .......................... | 43/21.2 |
| 2011/0083357 A1 * | 4/2011 | Blondek et al. | ................. | 43/27.4 |

* cited by examiner

*Primary Examiner* — David Parsley
(74) *Attorney, Agent, or Firm* — Duncan Palmatier

(57) ABSTRACT

A device to hold a fishing rod or a similarly-shaped object. The holder has a generally cylindrical shape with a longitudinal upper opening, whereby the edges of the opening can be drawn together and the diameter of the cylindrical holder decreased, so as to hold generally cylindrical-shaped objects, such as a fishing rod, of varying diameters. The holder can have a stem which can be received by a bore in a mounting bracket that allows the holder to rotate. A nub on the stem fits into slots in the bore, so that the holder can be fixed in one position.

11 Claims, 4 Drawing Sheets

ADJUSTABLE ROD HOLDER

FIELD OF THE INVENTION

The present invention relates to an adjustable device to hold fishing rods, or a similarly-shaped objects, having handles of different sizes. More specifically, the invention relates to a generally cylindrical holder with a longitudinal upper opening, whereby the edges of the opening can be drawn together and the inside diameter of the cylindrical holder decreased, so as to hold generally cylindrical-shaped objects, such as a fishing rod, of varying diameters.

BACKGROUND OF THE INVENTION

Most fishing rod holder patents disclose the same general structure; that is, a cradle, to hold the rod's handle, with a hoop at the back end of the cradle, to loop over the butt end of the rod handle and keep the rod from tipping forward. One example of this design is shown in U.S. Design Pat. No. D246,661 to Engblom. Although the Engblom design patent does not show a fishing rod being held, persons familiar with the field will appreciate that a fishing rod's handle is inserted from the front of the holder by putting the butt of the rod under the hoop and letting the rod down to rest in the cradle. Gravity keeps the rod in the holder and the rear hoop prevents the rod from being tipped out of the cradle if a fish strikes.

A number of other fishing rod holders employ various means to secure the rod in the holder. For example, U.S. Pat. No. 1,760,592 to Gift uses a "holding socket" (15) formed of a pair of "jaws" (16) that clamp around a rod's handle. The jaws are held in place around the rod by dropping tapering shanks (17) of the socket into a complimentary tapered bore (22). U.S. Pat. No. 2,481,118 to Johns uses a clamp (13) to keep the butt of the rod from tipping out of the cradle. U.S. Pat. No. 2,484,427 to Schwenk uses a hook (29) to keep the rod's butt from tipping out of the cradle. U.S. Pat. No. 4,063,704 to Rother uses a "resilient member" (20) that wraps around the rod to hold it in place. U.S. Pat. No. 4,586,688 to Hartman et al. uses a receptacle (2) and cover (3) as two halves of a clam shell arrangement to hold a rod. U.S. Pat. No. 4,763,435 to Deering uses velcro (10) to hold a rod in a cradle (7). U.S. Pat. No. 6,357,166 to Malmanger et al. uses a "fingers" (332) to hold the butt of a rod and a "retaining member" (320) to hold the forward part of the rod. U.S. Pat. No. 7,406,795 to Follmar uses clam shell-type structure formed of a "retention member" (25) and a "J-member" (26) that swings down and together hold a rod in place.

U.S. Design Pat. No. D307,786 to Cedergreen is titled and described as a "Fishing Rod Holder". Cedergreen's design an upwardly angled ring, open at the top, with a downwardly extending stem. Cedergreen does not show any object being held by the design, but it bears a close resemblance to a conventional microphone holder. It can only be supposed that the butt of a fishing rod's handle is lowered into the upwardly directed open end of the ring and jammed in place. Cedergreen's design has several functional disadvantages as a fishing rod holder. The inside diameter of Cedergreen's ring cannot be adjusted to accommodate differently sized rod handles. Because the Cedergreen design is intended to accept the butt end of a rod handle as it is lowered into the ring, there is a probability a fishing rod could be tipped down and pulled out of the holder, especially when a fish strikes, resulting in the loss of the fishing rod. The inside diameter of Cedergreen's ring is fixed, so it will not accommodate the tapered front portion of a fishing rod's handle. Cedergreen's holder has a fixed, upward tip angle that cannot be adjusted.

SUMMARY OF THE INVENTION

The present invention will hold fishing rods, or a similarly-shaped objects, having handles of different sizes. The holder has a generally cylindrical shape with a longitudinal, axially-oriented upper opening. By compressing the base of the cylinder, the edges of the upper opening can be drawn together and the diameter of the cylindrical holder decreased, so as to hold generally cylindrical-shaped objects of varying diameters. In one embodiment, the holder is comprised of a generally cylindrical bed, with a longitudinal upper opening, which rests on a curved cradle. The cradle's curve has a tighter arc than the curve of the outside of the bed. The bed is secured to the cradle by screws. As the screws are tightened, the base of the bed is drawn down into the tighter curve of the cradle which squeezes the bed, forcing the edges of the bed's opening to be drawn together, and decreases the inside diameter of the bed. In this way, the inside diameter of the bed can be adjusted to accommodate rod handles, or similarly-shaped devices, of different sizes. In another embodiment, the holder is comprised of a unitary bed and cradle structure. In this alternative embodiment, the bed and cradle can be formed together as a single unit, rather than as separate parts. A compression space is formed underneath the axial length of the cylindrical holder. Screws extend through the base of the holder and the compression space and thread into the cradle portion below the compression space. As the screws are tightened, the base of the cylindrical bed is forced down into the compression space and this forces the edges of the bed's opening to be drawn together, thereby decreasing the inside diameter of the bed. The holder of the present invention can be pivotably mounted on a mounting head to provide adjustment for the vertical tilt of the fishing rod. A pinch bolt can hold the tilt angle in a desired position. The mounting head can be rotatably secured in a mounting bracket to provide adjustment to the radial direction of the rod in the horizontal plane. A pinch bolt can hold the rod in the desired radial position. Alternatively, a nub on the stem of the mounting head can mate with positioning slots in the mounting bracket to fix the rod in the desired radial position.

When used with a fishing rod, the present invention holds the rod firmly in a fixed position so reeling in a fish can be accomplished with one hand. This can be useful for those who have limited use of their hands or only one hand.

DETAILED DESCRIPTION

Figure 1:
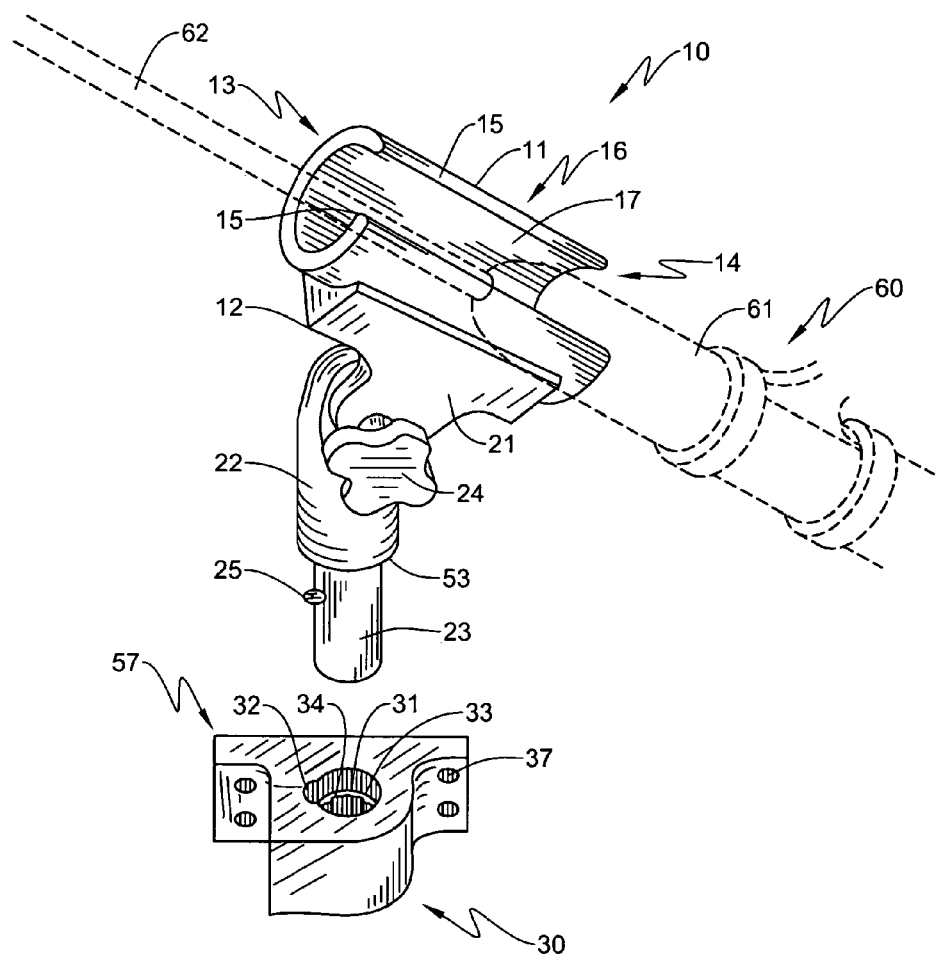
FIG. 1 is a three-quarter perspective view of the rod holder and mounting bracket of the present invention.
Figure 3:
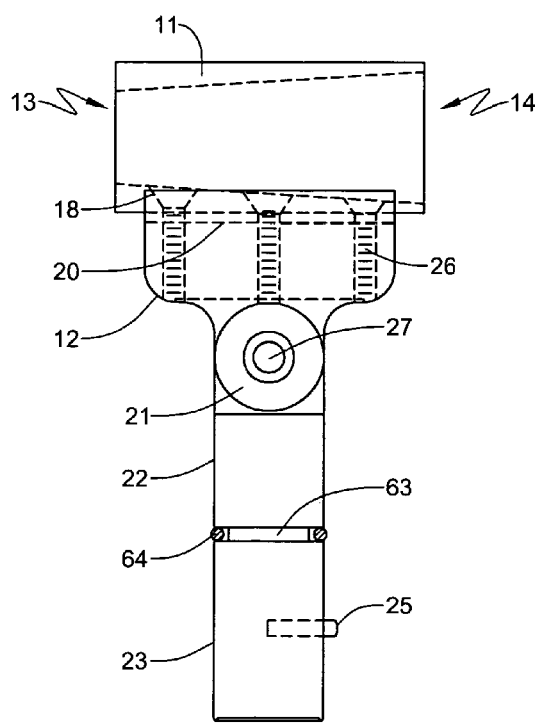
FIG. 3 is a left side perspective view of the rod holder bed and cradle of one embodiment of the present invention.
Figure 2:
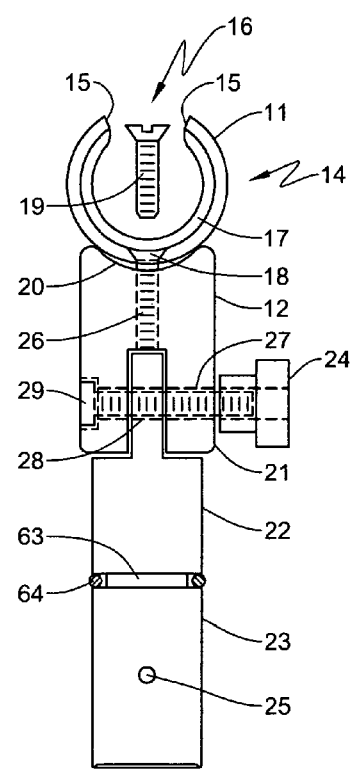
FIG. 2 is a rear perspective view of the rod holder bed and cradle of one embodiment of the present invention.

FIG. 1 shows the rod holder 10 of the present invention separated from its mounting bracket 30. The rod holder 10 is comprised of an elongated, cylindrically-shaped bed 11 open at the top 16 along its axis. As seen in FIGS. 2 and 3, the inner surface 17 of the bed 11 is tapered from the larger-diameter rear end 14 to the smaller-diameter front end 13. The taper of the bed's 11 inner surface 17 is sized to receive the generally-cylindrical, tapered handle 61 of a conventional fishing rod 60 or similarly shaped object. The bed's 11 top opening 16 is intended to allow the fishing pole 62 to be lowered into the bed 11 then pushed forward so that the rod's handle 61 is jammed into the tapered inner surface 17, thereby holding the rod 60 by friction.

In the embodiment shown in FIGS. 1 through 3, the bed 11 rests on a separate cradle 12. As seen in FIG. 2, the cradle 12 has a curved upper surface 20 on which the cylindrical bed 11 sits. However, the curve of the cradle's 12 surface 20 is a tighter curve than the curve of the outer surface of the bed 11. As seen in FIGS. 2 and 3, beveled holes 18 in the bottom of the bed 11 align with threaded bores 26 in the cradle 12. Screws 19 with beveled heads are inserted through the beveled holes 18 in the bed 11 and screwed into the threaded bores 26 in the cradle 12. As the screws 19 are turned and tightened against the beveled holes 18 in the bottom of the bed 11, the larger diameter of the outer surface of the bed 11 is forced down into the smaller diameter surface 20 of the cradle 12. The bed 11 is made of a material that can flex without breaking, such as plastic. Because the bed 11 is open 16 along its axial top, the force of the screws 19 along the bottom of the bed 11 pulls the edges 15 of the bed's 11 opening 16 inward, thereby decreasing the diameter of the inner cylindrical surface 17 and adjusting it to fit different sized fishing rod 60 handles 61. The cradle 12 may also be made of plastic, but it should be strong enough not to bend or give way when the bed 11 is screwed down into the cradle's 12 curved upper surface 20. Both the bed 11 and cradle 12 can easily be formed by molding, but can also be formed by machining.

As shown in FIGS. 1 through 3, the bed 11 and cradle 12 assembly is pivotably attached to a mounting head 22. The cradle 12 has a pair of downwardly extending legs 21. A transverse bore 27 extends through each leg 21. The mounting head 22 has a complimentary bore 28. A pinch bolt 29 extends through the bores 27 in the legs 21 of the cradle 12 and the complimentary bore 28 of the mounting head 22. A finger-operated knob 24 screws onto the pinch bolt 29. The knob 24 is tightened on the pinch bolt 29 and pinches the legs 21 against the mounting head 22, thereby holding the rod holder 10 at a fixed vertical position. By loosening the pinch bolt 24, the rod holder 10 can be fixed in different vertical positions. In this way, the fishing rod, or any other similarly-shaped object, can be tipped by the user at different vertical angles. As with the bed 11 and cradle 12, the mounting head 22 may be made of plastic. Because the head 22 does not have to flex, it can be made of many types of plastic or of other materials, such as metal.

Figures 4A, 4B:
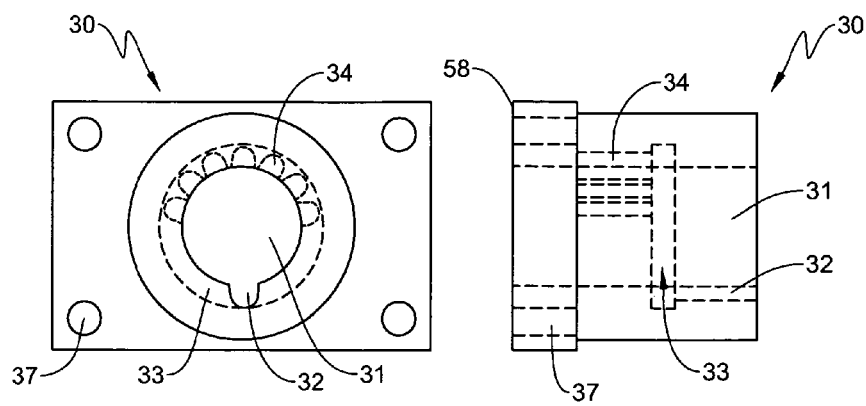
FIG. 4a is a top perspective view of one embodiment of a mounting bracket.
FIG. 4b is a side perspective view of one embodiment of a mounting bracket.

As seen in FIG. 1, the mounting head 22 has a downwardly extending stem 23 sized to fit rotatably in the bore 31 of a mounting bracket 30. In the embodiment shown in FIG. 1, the stem 23 is smaller than the upper part of the mounting head 22, thereby forming a shoulder 53. The shoulder 53 lets the mounting head 22 rest on the upper surface of the bracket 30. Protruding from the stem 23 is a nub 25 that extends radially outward from the stem 23. Extending downwardly at the periphery of the bore 31 of the mounting bracket 30, a slot 32 is sized to receive the nub 25. Thus, the nub 25 on the stem 23 is aligned with the slot 32 along the bore 31 of the mounting bracket 30 and the mounting head 22 is dropped down into the bracket 30. As seen in FIGS. 4a and 4b, the slot 32 meets an annular groove 33 midway down the bore 31 of the bracket 30. The groove 33 allows the nub 25 and the stem 23 to rotate in the bore 31, thereby allowing the user to adjust the rod holder 10 in various horizontal radial positions. Below the annular groove 33 are several positioning slots 34 sized to receive the nub 25. When the nub 25 is aligned with the positioning slot 34, the stem 23 can drop in the bracket's 30 bore 31 until the shoulder 53 comes to a rest on the upper surface of the mounting bracket 30. The rod holder 10 is then held in a fixed radial position by the nub 25 in the positioning slot 34. The user can change this position by pulling the mounting head 22 up, so that the nub 25 can rotate in the annular groove 33, then rotating the head 22 in the groove 33 until another desired radial position is selected, at which position the nub 25 is aligned with another positioning slot 34 and the head 22 is again allowed to drop. An annular groove 63 can be provided in the stem 23 in which an O-ring 64 may be provided in order to create resistance/tension to keep the stem 23 down and/or in place.

FIG. 1 shows a mounting bracket 30 with a vertically disposed bore 31 and four mounting holes 37 oriented horizontally. The mounting surface 57 is a vertical surface. The arrangement shown in FIG. 1 allows the bracket 30 to be mounted by screws (not shown) to the vertical face of a boat's rail (not shown). It is conventional to mount such brackets on the inside face of the rail. Alternatively, as seen in FIGS. 4a and 4b, the bracket 30 can have a bottom mounting surface 58, rather than the side mounting surface 57, so that the bracket 30 can be secured to the top, horizontal surface of the boat's rail.

Figures 5A, 5B:
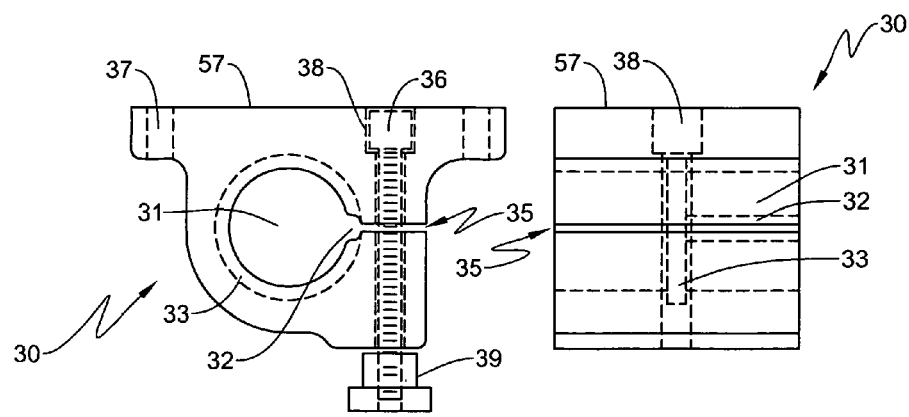
FIG. 5a is a top perspective view of another embodiment of a mounting bracket.
FIG. 5b is a top perspective view of another embodiment of a mounting bracket.

An alternative mounting bracket design is shown in FIGS. 5a and 5b. Rather than using the positioning slots 34 shown in FIGS. 1, 4a and 4b, the bracket 30 shown in FIGS. 5a and 5b uses a pinch bolt 36 and pinch knob 39 to adjust the radial horizontal position of the rod holder 10. A gap 35 extends from the bore 31 to the outer surface of the bracket 30, perpendicular to the axis of the hole 38 for the pinch bolt 36. By tightening the knob 39 on the pinch bolt 36, the diameter of the bore 31 can be reduced in order to squeeze the stem 23 of the rod holder's 10 head 22 and hold it in a fixed position.

As with the bed 11, cradle 12 and mounting head 22, the mounting bracket 30 can be molded in plastic, although other materials, such as metal, are suitable.

Figures 6, 7:
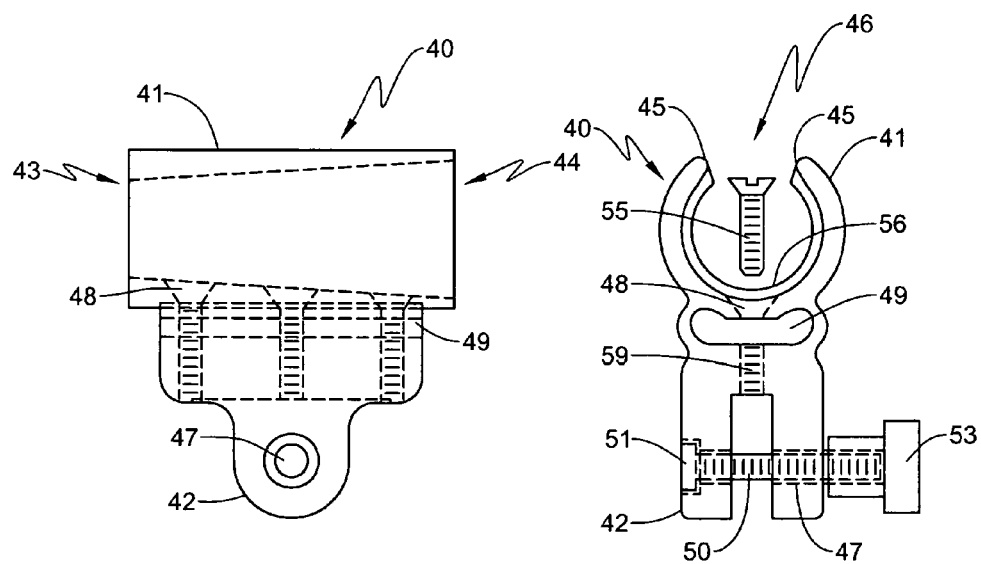
FIG. 6 is a rear perspective view of a unitary rod holder bed and cradle of another embodiment of the present invention.
FIG. 7 is a left side perspective view of the unitary rod holder bed and cradle of another embodiment of the present invention.

An alternative embodiment of the rod holder 10 of the present invention is shown in FIGS. 6 and 7. This embodiment provides a unitary bed and cradle structure 40. In this alternative embodiment, the bed and cradle can be formed together as a single unit 40, rather than as separate parts. The bed 41 is a substantially cylindrical structure with a longitudinal, axially-oriented opening 46 along the top of the bed 41. The open cylinder forms edges 45 along the opening 46. A compression space 49 is formed underneath the axial length of the cylindrical holder 41. Screws 55 extend through beveled holes 48 in the base 56 of the holder 41 and the compression space 49 and screw into threaded screw holes 59 in the area below the compression space 49. As the screws 55 are tightened, the base 56 of the cylindrical bed 41 is forced down into the compression space 49 and this forces the edges 45 of the bed's 41 opening 46 to be drawn together, thereby decreasing the inside diameter of the bed 41. The compression space 49 may be shaped so that the material between the base 56 of the inside surface of the bed 41 is thinnest, thereby promoting downward deflection by the screws and complimentary inward squeezing of the edges 45. In a preferred embodiment, the inside shape of the bed 41 is tapered from the back end 44 to the front end 43. This tapered shape is sized for conventional finishing rod handles. The back end 44 of the bed 41 can have a larger diameter than the front end 43, so that the tapered handle of a fishing rod can be pushed forward into the 41 and held in place by friction. The unitary holder 40 may be formed of a flexible material that allows the bed 41 to bend to different diameters. Plastic is one material suitable for the holder 40. The holder 40 may be molded in plastic and the compression space 49 can be formed in the molding process or machined after molding.

The holder 40 can also include a unitary holder pivot structure for pivotably attaching the holder 40 to a mounting head, such as the head 22 described above and shown in FIGS. 1 through 3. Thus, holder 40 has a pair of downwardly extending legs 42. A transverse bore 47 extends through each leg 42 and is aligned with the mounting head's 22 complimentary bore 28 (shown in FIG. 2). A pinch bolt 51 extends through the bores 47 in the legs 42 of the holder 40 and the complimentary bore 28 of the mounting head 22. A finger-operated knob 53 screws onto the pinch bolt 51. The knob 53 is tightened on the pinch bolt 51 and pinches the legs 42 against the mounting head 22, thereby holding the rod holder 40 at a fixed vertical position. By loosening the pinch bolt 53, the rod holder 40 can be fixed in different vertical positions. In this way, the fishing rod, or any other similarly-shaped object, can be tipped by the user at different vertical angles.

While the present adjustable holder been described herein with reference to particular embodiments and a specific application to fishing rods, as described above, a latitude of modification, various changes, and substitutions, as well as different applications, such as a microphone holder, are intended in the foregoing disclosure. It will be appreciated that in certain instances some features of the invention will be employed without a corresponding use of other features without departing from the scope of the invention. While the above description contains many specific embodiments, these should not be construed as limitations on the scope of invention. Accordingly, the scope of invention should be determined by the claims set forth herein and their equivalents.

I claim:

1. An adjustable rod holder comprising:
    an elongated open-ended bed having an axis, said bed further comprising a longitudinal, axially oriented inside surface, said bed further comprising a longitudinal, axially-oriented bottom portion and a longitudinal, axially-oriented open top, said open top comprising longitudinal, axially-oriented edges along the open top, and said inside surface further having a base surface,
    a cradle connected to the bottom portion of the bed, said bed and cradle further comprising an open area between the bottom portion of the bed and the cradle,
    a tightener connected to the bottom portion of said bed and extending through the open area toward the cradle,
    wherein tightening said tightener in a direction toward the cradle pulls the bottom of the bed toward the cradle and pulls together the longitudinal edges of the bed.

2. The adjustable rod holder of claim 1 further comprising first and second open ends at opposite ends of the elongated open-ended bed, wherein the inside surface of the bed forms a longitudinal, axially oriented conical surface having a first diameter at said first open end and a second diameter at said second open end, and wherein the second diameter is smaller than the first diameter.

3. The adjustable rod holder of claim 1, wherein said tightener is a screw.

4. The adjustable rod holder of claim 1 wherein the bed and cradle are separate parts that are connected to each other by said tightener.

5. The adjustable rod holder of claim 4, wherein the tightener is a threaded fastener that mates with threads provided in the cradle below the bottom of the bed and the open space.

6. The adjustable rod holder of claim 1, wherein the cradle is pivotably mounted to a stem and said stem is rotatably mounted to a mounting bracket having a bore sized to receive said stem.

7. The adjustable rod holder of claim 6, wherein the mounting bracket further comprises an outer surface, and the bore of said mounting bracket further comprises a bore axis and a gap between said bore and outer surface, wherein said gap is aligned with said bore axis, wherein said mounting bracket further comprises a pinch bolt aligned transverse to said bore axis and across said gap, and wherein said pinch bolt draws together said gap and pinches the bore about the stem.

8. The adjustable rod holder of claim 6 further comprising a radial groove in the stem and an O-ring sealingly engaged in the radial stem groove.

9. An adjustable rod holder comprising:
    an elongated open-ended bed having a bed axis, said bed further comprising a longitudinal, axially oriented inside surface, said bed further comprising a longitudinal, axially-oriented bottom portion and a longitudinal, axially-oriented open top, said longitudinal, axially-oriented bottom portion forming a bed arc defined by a bed radius from the bed axis, and said open top comprising longitudinal, axially-oriented edges along the open top, and said inside surface further having a base surface,
    a cradle having a cradle axis, said cradle further comprising an axially-oriented cradle surface forming a cradle arc defined by a cradle radius from the cradle axis, said cradle surface connected to the bottom portion of the bed, wherein the bed radius is greater than the cradle radius such that said bed and cradle further comprise an open area between the bottom portion of the bed and the cradle,
    a tightener connected to the bottom portion of said bed and extending through the open area toward the cradle,
    wherein tightening said tightener in a direction toward the cradle pulls the bottom of the bed toward the cradle and pulls together the longitudinal edges of the bed.

10. The adjustable rod holder of claim 9 further comprising first and second open ends at opposite ends of the elongated open-ended bed, wherein the inside surface of the bed forms a longitudinal, axially oriented conical surface having a first diameter at said first open end and a second diameter at said second open end, and wherein the second diameter is smaller than the first diameter.

11. The adjustable rod holder of claim 9 wherein the bed and cradle are separate parts that are connected to each other by said tightener.

* * * * *